Patented Oct. 21, 1952

2,615,007

UNITED STATES PATENT OFFICE 2,615,007

EPOXIDE RESINS

Sylvan Owen Greenlee, Racine, Wis., assignor to Devoe & Raynolds Company, Inc., Louisville, Ky., a corporation of New York No Drawing. Application December 8, 1950, Serial No. 199,931

6 Claims. (Cl. 260—47)

This invention relates to new epoxide resins which are valuable for use in the manufacture of varnishes, molding resins, adhesives, films, fibers, etc. The invention includes the epoxide resins and the method for their manufacture.

The new epoxide resins are made by reacting bisphenol (p,p'dihydroxydiphenyldimethyl methane) with epichlorhydrin or with glycerol dichlorhydrin with the use of aqueous caustic alkali under regulated conditions to give complex polymeric polyether derivatives of bisphenol. In making the new epoxide resins the proportions of bisphenol and of epichlorhydrin or glycerol dichlorhydrin vary from about 1 bisphenol to 1.2 epichlorhydrin or glycerol dichlorhydrin to about 1 bisphenol to 1.5 epichlorhydrin or glycerol dichlorhydrin, together with sufficient caustic alkali to combine with the chlorine of the epichlorhydrin or glycerol dichlorhydrin. At least part of the caustic alkali is present as aqueous caustic alkali in the initial mixture to convert the bisphenol at least in part into its alkali salt and the reaction is continued with heating for a sufficient period of time to effect substantially complete reaction of the bisphenol with the epichlorhydrin or glycerol dichlorhydrin to produce solid water-insoluble resinous products having, after washing with water to remove byproduct salt and any excess caustic alkali, softening points within the range of from about 80° C. to about 115° C. and with an epoxide equivalent within the range of from about 591 to about 1179.

The reaction of the bisphenol and halohydrin (epichlorhydrin or glycerol dichlorhydrin) is advantageously carried out with the use of aqueous caustic alkali in amount sufficient to combine with the halogen of the halohydrin used or an amount somewhat in excess. Thus, when bisphenol is reacted with epichlorhydrin the proportion of alkali used is sufficient to combine with the chlorine of the epichlorhydrin or an amount somewhat in excess of that amount. When glycerol dichlordydrin is used the amount of alkali is sufficient to combine with the chlorine of the dichlorhydrin or an amount somewhat in excess of that amount. And when mixtures of epichlorhydrin and glycerol dichlorhydrin are used the amount of alkali is similarly sufficient to combine with the halogen of the halohydrins or somewhat in excess of that amount.

The new epoxide resins vary somewhat in their compositions and properties, depending on the proportions of reagents used and the conditions of the reaction.

The primary reactions appear to be reactions in which the phenolic hydroxyls of the bisphenol react with the halohydrin to give straight chain polymers such as illustrated in the following formula or structure:

$$R_2-[O-R-O-R_1]_n-O-R-O-R_2$$

where R is the diphenyldimethyl methane residue of the bisphenol, $R_1$ is an intermediate hydroxyl-containing residue of the epichlorhydrin or glycerol dichlorhydrin, and $R_2$ is mainly an epoxide-containing residue and in minor part a hydroxyl-containing residue from the chlorhydrin, and $n$ represents the extent of the polymerization.

Thus, in the case of a product made from bisphenol and from epichlorhydrin in the proportion of 2 mols of bisphenol to 3 mols of epichlorhydrin the product might be considered to have the composition illustrated by the above formula where $n=1$. This formula assumes a straight chain reaction which appears to be the primary reaction between the bisphenol and the chlorhydrin. Reaction is not, however, excluded between the chlorhydrin and the intermediate alcoholic hydroxyl groups such as would give branch chain formulas; and in the case of more complex polymers, where $n$ in the above formula is higher than 1, such side chain reaction products and polydimensional polymers are probably formed to some extent either by reacting with intermediate hydroxyl groups of intermediate reaction products with the halohydrin or with terminal epoxide groups of other intermediate reaction products. Such terminal epoxide groups can also react with terminal hydroxyl groups.

It is difficult to determine the exact nature of the complex polymerization process which takes place but I am led to believe that the reaction is primarily one between the phenolic hydroxyls and the chlorhydrins and to a limited extent one of reaction of chlorhydrin or epoxide groups with aliphatic hydroxyl groups, and that the resulting complex epoxide resins are largely straight chain polymeric products of the formula indicated above and to some extent more complex polydimensional structures.

In making the new epoxide resins the bisphenol and the chlorhydrin (epichlorhydrin or glycerol dichlorhydrin) are advantageously all added together at the outset, together with aqueous alkali which may be used to dissolve or partly dissolve the bisphenol to form the diphenoxide or a mono-phenoxide either before admixture with the chlorhydrin or after admixture. The amount of caustic alkali added to dissolve or partly dissolve the bisphenol, and whether present at the outset or added in successive amounts, should be sufficient to combine with the chlorine of the chlorhydrin used. With epichlorhydrin, for example, the amount of caustic alkali should be equal to or somewhat in excess of the theoretical amount for combining with the epichlorhydrin. With glycerol dischlorhydrin 2 mols of caustic alkali or somewhat more are required for 1 mol of the dichlorhydrin. The presence of an excess of alkali is advantageous in securing completion of the reaction, and also influences the polymerization and the nature of the polymerization products.

Products of a predetermined degree of polymerization and of different degrees of polymerization can be obtained by regulating the proportions of the reactants used. Thus, to give a composition having the general or approximate composition indicated by the above formula, where $n=1$ the proportions of epichlorhydrin and bisphenol should be about 3 to 2. Products of higher degree of polymerization and increased complexity of composition are obtained with lower ratios of epichlorhydrin to bisphenol. For example, a product made from 5 mols of epichlorhydrin and 4 mols of bisphenol would have a theoretical composition approximating that of the above formula where $n=3$. Yields of products can be obtained which represent or approximate the theoretical yields indicating that the complex polymerization products contain the phenolic and helohydrin residues in substantially the same proportion in which the reactants are used.

The range of proportions and degree of polymerization can be varied over a considerable range. With bisphenol and epichlorhydrin ranges of proportions corresponding to that of the above formula where $n$ is from 1 to 5 are particularly advantageous, giving complex reaction products having a melting point up to around 100° C. or higher and from which the salt formed as a byproduct and any excess caustic alkali may be removed by washing.

The new epoxide resins contain terminal epoxide groups and intermediate alcoholic hydroxyl groups and may to some extent contain terminal alcoholic hydroxyl groups. They are in general water-insoluble resinous products varying in consistency and melting point and are capable of polymerization by the addition of small amounts of suitable polymerization agents such as sodium phenoxide or difunctional phenoxides to give products which form valuable molding compositions and articles or which can be used in making coating compositions, films, etc. This further polymerization in the presence of polymerizing agents other than polyfunctional phenoxides appears to be largely or mainly one of further reaction of terminal epoxide groups with hydroxyl groups. The polymerization takes place without evolution of byproducts.

The process which can be advantageously used in preparing the new epoxide resins will be illustrated in connection with the reaction of bisphenol with epichlorhydrin.

A caustic soda solution is made containing 1 mol caustic soda per mol of bisphenol dissolved in an amount of water, e. g., twice that of the weight of the bisphenol to be used. The bisphenol is then added to the caustic solution in a suitable reaction kettle provided with a stirrer and stirred until the phenol is dissolved. The use of this amount of alkali is sufficient to convert only half of the phenolic hydroxyls of the bisphenol into phenoxide. The epichlorhydrin is then added to the solution at a temperature of 35–45° C. with continuous agitation of the reaction mixture. The temperature rises over a period of e. g. 30 minutes to around 60–75° C. depending upon the initial temperature, the batch size and the amount of water used, larger amounts of water tending to control the exothermic reaction temperature. The temperature rise due to the exothermic reaction can be controlled to some extent by using larger or smaller amounts of water.

After this preliminary reaction an additional amount of sodium hydroxide conveniently in water solution, and sufficient in amount with that previously added, to react completely with the chlorine of the epichlorhydrin is added, and heat is applied if necessary to raise the temperature to around 80–85° C. over a period of around 15–20 minutes. A further amount of sodium hydroxide in water is advantageously added at this point, in excess of the theoretical amount required to react with all of the chlorine present in the epichlorhydrin, and this amount may advantageously be an appreciable excess of caustic soda to secure a higher degree of polymerization in the reaction mixture or to bring the reaction to the desired extent in a shorter period of time. The mixture is heated to around 95° C. and held at around 95–100° C. for a sufficient length of time to give the desired products which may vary, e. g., from ½ hour to 3 hours or more.

The reaction mixture separates into an upper aqueous layer which is drawn off and the residue, e. g., of taffy-like consistency settles to the bottom. This product is then washed by stirring with hot water for 25–30 minutes after which the wash water is drawn off. This washing procedure is repeated e. g. 4 to 6 times, or as many times as is necessary, to effect removal of any unreacted sodium hydroxide and the byproduct sodium chloride. Dilute acids such as acetic or hydrochloric acid may be used to neutralize the excess caustic during washing. It is usually desirable to wash the product entirely free from salt and caustic since failure to remove the unreacted caustic or basic salts such as sodium acetate may result in further polymerization during the drying process when heat is applied to remove the last traces of water. The wet resin is dried by heating and stirring until the temperature rises substantially above the boiling point of water.

The above procedure has been found an advantageous procedure for use in producing the new epoxide resins. The addition of alkali in stages and with only partial conversion of bisphenol into phenoxide in the first stage results in reaction of the bisphenol with part of the epichlorhydrin and the removal of chlorine from only part of the epichlorhydrin while part of the phenolic hydroxyls of the bisphenol are left in a free state such that they are free to react with epoxide groups. The subsequent addition of caustic is sufficient to remove chlorine from the remaining epichlorhydrin in the further carrying out of the process while the use of a regulated excess of alkali over that required for combining with the chlorine to form salt aids in promoting and controlling the further carrying out of the process.

Where all of the caustic alkali is added at the beginning of the process and all of the reactants are added the reaction is more exothermic and temperature control may be necessary by external cooling or the addition of ice or cold water to keep the reaction under control. Excessive amounts of caustic sometimes causes further polymerization so that it becomes difficult to control the melting point of the product. Lesser amounts of excess caustic approaching the theoretical require longer reaction periods for the process. In general the process should be controlled so that the reaction product does not have a melting point more than 10–15° higher than the temperature of the water used for washing. Thus a product whose softening point is around 125° C. may be prepared and washed in a closed pressure kettle at temperatures above 110–115° C.

A typical example illustrative of the process in which approximately 3 mols of bisphenol is reacted with 4 mols of epichlorhydrin and an amount of sodium hydroxide approximately 25% in excess of the theoretical is carried out as follows: The ingredients used were as follows: 307.5 pounds bisphenol, 166.3 pounds epichlorhydrin, 96 pounds caustic soda, 600 pounds water. 54 pounds of the caustic were dissolved in 600 pounds of water in an open kettle provided with a mechanical agitator. The bisphenol was added and the mixture stirred for about 10 minutes at a temperature of about 33° C., the epichlorhydrin was added and the temperature increased to about 65° C. from the exothermic heat of reaction. A solution of 18 pounds of caustic soda dissolved in 4 gallons of water was then added with continued stirring with a rise of temperature to around 79° C. Heat was applied to raise the temperature to about 85° C. and a solution of 24 pounds of caustic soda dissolved in 5 gallons of water was added and heating continued while maintaining a temperature around 90 to 100° C. for a period of about 1 hour. External heating was discontinued, 5 gallons of cold water added to check boiling of the water and the upper aqueous layer was then drawn off.

The product was washed with 50–60 gallons of boiling water for a period of 20 minutes, then with a similar amount of boiling water containing acetic acid to neutralize unreacted caustic soda, and then 4 times in succession with a similar amount of boiling water. After as much as possible of the water had been removed, external heat was applied with continued stirring to dry the product, the temperature rising to 150° C. The liquid product was drawn off and allowed to solidify, and had a softening point of 95° C. (Durran's mercury method).

The new epoxide resins can advantageously be used for reaction with additional bisphenol or other dihydric phenol to produce higher melting point epoxide resins, this two-step procedure being described in my companion application Serial No. 199,932. Products having a melting point of e. g., up to around 150° C. or higher can thus be produced by producing first a lower melting point epoxide resin which melts, e. g., at 80° C., washing the resin to free it from salt and excess caustic and then admixing with additional bisphenol in amount less than that sufficient to react with the epoxide groups of the epoxide resin to produce a higher melting point epoxide resin which needs no purification since no byproducts are formed in this further reaction of the epoxide resin with the bisphenol.

The nature and advantages of the invention will be further illustrated by the following specific examples but it will be understood that the invention is not limited thereto. The parts are by weight.

Where molecular weight determinations are given they were made by a standard boiling point elevation method. In some cases the molecular weight values corresponded approximately to the theoretical values for a straight chain polymer of the formula given above. In some cases a higher molecular weight value was obtained, seemingly indicating a more complex structure. When short periods of reaction are used incomplete reaction products of lower average molecular weight may be formed which however are capable of further reaction. As above pointed out, an appreciable excess over the theoretical amount of caustic alkali favors the completion of the reactions while excess caustic and prolonged reaction periods seem to favor reactions.

In some cases the equivalent weights to esterification were determined by heating the epoxide composition with about twice the theoretical amount of linseed oil acids necessary to react with all the hydroxyl and epoxy groups at 228° C. until a constant acid value was obtained. By back titrating the unreacted linseed acids, the esterifiable hydroxyl content was calculated from the acid values. In view of the possibility or probability that some polymerization takes place during this high temperature esterification the results can only be considered a rough indication of the total hydroxyl plus epoxy groups esterified.

The epoxide group content of the complex epoxide resins was determined for practical purposes by determining the equivalent weight of the composition per epoxide group. The method used for determining the epoxide content of the epoxide resins hereinafter indicated was by heating one gram sample of the epoxide composition with an excess of pyridine containing hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equivalent to one epoxide group.

*Example 1.*—A mixture of 5 mols of bisphenol and 7 mols epichlorhydrin were reacted with 9.05 mols caustic soda, the reaction going from 41 to 91° C. over 70 minutes and being maintained at 90 to 104° C. for 75 minutes. The product after washing had a softening point of 84° C., an average molecular weight of 791 and an equivalent weight to epoxide of 591.5 corresponding to an average of about 1.3 epoxy groups per molecule, and an equivalent weight to esterification of 175.5.

*Example 2.*—A mixture of 3 mols of bisphenol and 4 mols of epichlorhydrin were reacted with the addition of caustic soda solution containing 5.2 mols, the temperature going from 30 to 100° C. in 85 minutes, and being kept at about 100° C. for 65 minutes. The resulting resin after washing and drying had a softening point of 90° C., an average molecular weight of 802, an equivalent weight to epoxide of 730, corresponding to about 1.1 epoxy groups per molecule, and an equivalent weight to esterification of 180.

*Example 3.*—4 mols of bisphenol and 5 mols of epichlorhydrin were reacted with the addition of caustic soda solution (6.43 mols), the reaction going from 40 to 100° C. in 80 minutes, and being kept at 100–104° C. for 60 minutes. The resulting resin after washing and drying had a softening point of 100° C., an average molecular weight of 1133, an equivalent weight to epoxide of 860, corresponding to about 1.3 epoxide groups per molecule, and an equivalent weight to esterification of 200.

*Example 4.*—5 mols of bisphenol and 6 mols of epichlorhydrin were reacted with the addition of caustic soda solution (7.78 mols), the reaction going from 40 to 100° C. in 60 minutes. The resulting resin after washing and drying had a softening point of 112° C., an average molecular weight of 1420, an equivalent weight to epoxide of 1179, corresponding to an average of about 1.2 epoxide groups per molecule, and an equivalent weight to esterification of 198.

*Example 5.*—A mixture of 3 mols of bisphenol and 4 mols of epichlorhydrin were reacted with the addition of 4.28 of caustic soda in solution, the reaction going from 40 to 98° C. in 90 minutes, and being kept at 100° C. for 60 minutes. The resulting resin after washing with water and drying had a softening point of 80° C. and an equivalent weight to epoxide of 572.

*Example 6.*—A mixture of 3 mols of bisphenol and 4 mols of glycerol dichlorhydrin were reacted with the addition of 8 mols of aqueous sodium hydroxide, the reaction going from 58 to 100° C. in 105 minutes and being kept at 100° C. for 60 minutes. The resulting epoxide resin after washing with water and drying had a softening point of 100° C. and an equivalent weight to epoxide of 964.

In general the complex resins are soluble in solvents such as acetone, methyl ethyl ketone, diacetone alcohol, cyclohexanone, etc. Resins of lower melting point and lower degree of polymerization are soluble in toluene. Solutions of the resins can be used in making clear and pigmented varnishes, in making transparent films and filaments, and in impregnating and laminating and coating wood, fabrics, and other porous of fibrous materials, etc. When a small amount of a suitable catalyst is added to the solution, the resulting film or coating, on heating, is converted into an infusible insoluble product.

As an example of use of the new resins for making enamels, a black enamel was prepared from the resin of Example 2 with a softening point of 90° C. of dissolving the resin in an equal weight of methyl isobutyl ketone to form a 50% solution, adding 103.7 parts of carbon black to 600 parts of the 50% solution, grinding the mixture in a steel ball mill five days, then adding 175 parts of methyl isobutyl ketone and 12 parts of sodium phenoxide as catalyst.

The resulting black enamel, when formed into films, dried overnight to a tough, flexible, glossy film at room temperature, and it converted to the same type film when baked in an oven for 15 minutes at 150° C.

A similar result was obtained when 12 parts of monosodium bisphenoxide was used instead of 6 parts of sodium phenoxide as the catalyst.

A gray enamel was prepared by grinding in a steel ball mill for 5½ hours a mixture of pigments made up of 21 parts of lamp black, 24.5 parts of a lemon yellow ferric hydroxide, 3.5 parts of red ferric oxide and 630 parts of rutile titanium dioxide, adding 2032 parts of the same epoxyhydroxy resin, melting at 90° C., as in the preceding example, but adding it to the mill in lump form, then adding 2032 parts of methyl isobutyl ketone and 101.6 parts of sodium phenoxide as catalyst. Another similar enamel was made with the addition of 101.6 parts of mono-sodium bisphenoxide instead of 101.6 parts of sodium phenoxide.

The resulting gray enamel had similar conversion characteristics to the enamels of the preceding example.

The remarkable properties of the new resin when baked at high temperatures is illustrated by the following example:

The resin of Example 1 above having a softening point of 84° C. was dissolved in methyl ethyl ketone in the proportion of 500 parts of resin to 600 parts of solvent, and 5% of the mono potassium salt of bisphenol on the weight of the resin was added, the monophenoxide being dissolved in a small amount of ethanol before addition. A film formed from the solution of approximately .003 inch in thickness was air dried over night and baked at 400° F. for five hours and at 425° F. for one hour without objectionable discoloration of the film. The resins are well adapted for use where the resulting films are subjected to high temperature.

The new epoxy resins are also valuable for use in making molding compositions and articles by admixing a small amount of catalyst and heating to effect final hardening or polymerization. The product is characterized by remarkable chemical resistance.

It is one of the characteristics of these products that on final polymerization or reaction the products tend to expand on hardening, and differ in this respect from resins which shrink on hardening. For example, a resin made from 2 mols of bisphenol and 3 mols of epichlorhydrin with the use of aqueous caustic soda, and having a softening point of 94° C., was polymerized and the density of the resin determined before and after polymerization. The density of the unpolymerized resin was 1.1979 and of the polymerized resin 1.1624. While I do not desire to limit myself by any theoretical explanation of the action which takes place on polymerization and which results in expansion and decrease in density, it seems probable that the resulting opening up of the closed ring epoxide groups, as by reaction with hydroxyl groups to form ether linkages, involves some change in space relationship or expansion within the composition which explains the lowering of specific gravity and expansion on hardening.

This lack of contraction or slight expansion in the mold on hardening is highly valuable for many applications, enabling tight fitting molded articles to be obtained. For example, brushes of many types are made by using a heat converting resin to cement the bristles into the brush ferrule. If the resin contracts during heat conversion, the molded article tends to become loose fitting in the ferrule. The new complex epoxide resins and compositions of the present invention give a tight fitting mold within the brush ferrule. Similarly molded insets can be made which are tight fitting when the composition has been molded in place.

The new complex polymeric epoxides, containing reactive epoxide groups, can be reacted with compounds containing active hydrogen, such as amines, and particularly polyamines, amides, mercaptans, polyhydric alcohols, polyimines, etc. to give a wide variety of valuable reaction products. Thus, difunctional reactants or polyfunctional reactants may serve to cross-link different molecules through reaction with terminal epoxide groups, and in some cases through intermediate hydroxyl groups. By using a difunctional reactant or polyfunctional reactant that reacts with epoxide groups but not with hydroxyl groups, in proportions equivalent to the epoxide groups, different molecules may be joined together by cross-linking in this way. Where cross-linking reagents are used that react with hydroxyl, or with both hydroxyl and epoxy groups, a different and more complex structure may be obtained. The use of less than the equivalent amount of cross-linking reagents enables modified products to be obtained, and in some cases infusible products.

Thus by compounding the new complex epoxide compositions with an amount of polyhydric phenol, approximately equivalent to the epoxide content of the composition, and with the use of a small amount of catalyst such as the alkali salt of the polyhydric phenol, the resulting mixture on heating will cause reaction between the polyhydric phenol and the epoxide groups with resulting cross-linking and the production of higher molecular and infusible products.

Similarly, the new complex epoxides can advantageously be reacted with amines to form valuable amine-epoxy reaction products which may be infusible products having valuable properties for making films, molded compositions, etc.

Other polyfunctional cross-linking reactants which react with epoxide or hydroxyl groups can similarly be used for bringing about cross-linking and the conversion of the new epoxides to infusible products including diisocyanates, e. g., methylene bis (4 phenyl) isocyanate, dialdehydes, e. g., glyoxal, dimercaptans, amides, polyamides, etc.

Thus the new epoxide products and compositions are valuable as raw materials in the manufacture of varnishes, molding resins, adhesives, fibers or filaments, etc. They are capable of polymerization in the presence of catalysts or by the use of cross-linking reactants.

Where the polymerization of the complex epoxyhydroxy compositions takes place through reaction of epoxides with hydroxyl groups, the polymerization products may be free, or relatively free, from epoxy groups and contain only or mainly hydroxyl groups in addition to hydrocarbon residues. The complex products vary from soft to brittle solids. The polymerized products give compositions varying from hard, brittle, fusible solids to hard, non-brittle, infusible solids. The new complex epoxide compounds polymerize to give products containing a high percentage of hydroxyl groups.

The brittle forms of the products and of polymerization products are useful for esterification with organic acids to form esters which are useful as plasticizers or as drying oil compositions, etc., depending upon the type of organic acid used. In general, the esters with low molecular weight acids, such as acetic acids and benzoic acid, give brittle resins which are soluble in typical varnish constituents including drying oils and are excellent resins for varnish manufacture. Esters of the new complex epoxide compositions with unsaturated acids such as those derived from unsaturated oils are excellent drying compositions. Esters derived from long chain saturated acids, such as lauric, palmitic, and stearic acids, give wax-like products useful as waxes and plasticizers. Many variations and types of useful products may be obtained by esterifying the new complex epoxy-hydroxy compounds with various combinations of saturated and unsaturated, monobasic and polybasic, and resin acids or the anhydrides of such acids.

The new epoxy compositions polymerize or further react in the presence of a catalyst to give higher melting and finally infusible products. The higher melting products which are still fusible are useful raw materials for esterification to give plasticizers, waxes, varnish and lacquer resins, and drying compositions. If the epoxy compositions are sufficiently polymerized, infusible products result. This polymerization reaction may be carried out after the epoxy compositions have been spread out in thin layers in which case protective films are formed. The polymerization may be carried out in molds to give excellent, infusible molded objects. The complex epoxy compositions make excellent bonding materials for glass when polymerized in layers between glass plates. The new compositions are likewise useful as material for bonding wood, impregnation of wood, fabric coating and impregnation, surface coatings—both clear and pigmented—on glass, wood and metal, and for the formation of synthetic bristles or fibers when applied in the non-polymerized state and then heat polymerized in the presence of catalysts or certain coupling agents.

The epoxide groups of the complex epoxide composition being reactive with active hydrogen compounds such as amines, amides, phenols, and alcohols, may be reacted with such compounds to give a wide variety of useful products, including products which are cross-linked through polyfunctional reactants such as those above mentioned.

The final, infusible polymerization and reaction products made with the new complex epoxides have a remarkable combination of desirable properties, including resistance to water, solvents, alkalies and acids, toughness combined with hardness, flexibility at low temperatures, ability to withstand high temperatures with little or no discoloration, resistance to chemicals, wettability to most pigments, low viscosity at high solids content of solutions, and hardening of thick films through chemical reactions within the film itself when a suitable catalyst or cross-linking reactant is used so that paint and varnish coatings far beyond the usual thickness can be applied.

Such properties make the new compositions and products made therefrom valuable for many practical purposes.

This application is a continuation-in-part of my prior application Serial No. 617,176, filed September 18, 1945, and now abandoned.

I claim:

1. The process of producing complex epoxide resins which are polymeric polyether derivatives of p,p'dihydroxydiphenyldimethyl methane, which comprises reacting a mixture of p,p'dihydroxydiphenyldimethyl methane and epichlorhydrin, the molar ratio of p,p'dihydroxydiphenyldimethyl methane to epichlorhydrin in said mixture being between 1:1.2 and 1:1.5, with aqueous caustic soda sufficient in amount to combine with the chlorine of the chlorhydrin, at least part of the aqueous caustic soda being present in the initial mixture to convert the p,p'dihydroxydiphenyldimethyl methane at least in part into its sodium salt, the reaction being continued with heating for a sufficient period of time to effect substantially complete reaction of the p,p'dihydroxydiphenyldimethyl methane and epichlorhydrin to produce solid, water-insouble resinous products having, after washing with water, softening points within the range of from about 84° C. to about 112° C. and with an epoxide equivalent within the range of from about 591 to about 1179.

2. Complex water-insoluble epoxide resins prepared in accordance with the process set forth in claim 1.

3. The process of producing complex epoxide resins which are polymeric polyether derivatives of p,p'dihydroxydiphenyldimethyl methane, which comprises reacting a mixture of p,p'dihydroxydiphenyldimethyl methane with a chlorohydrin selected from the class which consists of epichlorhydrin and glycerol dichlorhydrin, the molar ratio of p,p'dihydroxydiphenyldimethyl methane to the chlorhydrin in said mixture being between 1:1.2 and 1:1.5, with aqueous caustic soda sufficient in amount to combine with the chlorine of the chlorhydrin, at least part of the aqueous caustic soda being present in the initial mixture to convert the p,p'-dihydroxydiphenyldimethyl methane into its sodium salt, the reaction being continued with heating for a sufficient period to effect substantially complete reaction of the p,p'-dihydroxydiphenyldimethyl methane and the chlorhydrin to produce solid, water-insoluble, resinous products having, after washing with water, softening points within the range of from about 80° C. to about 115° C. and with an epoxide equivalent within the range of from about 572 to about 1179.

4. Complex epoxide resins prepared in accordance with the process set forth in claim 3.

5. The process according to claim 1 in which sufficient dilute caustic soda is present in the initial mixture to convert the p,p'dihydroxydiphenyldimethyl methane into its sodium salt.

6. The process according to claim 1 in which the dilute caustic soda is added in installments, partly to dissolve the p,p'dihydroxydiphenyldimethyl methane at the outset and partly in subsequent successive installments.

SYLVAN OWEN GREENLEE.

REFERENCES CITED

The following references are of record in the file of this patent:

FOREIGN PATENTS

| Number | Country | Date |
|--------|---------|------|
| 518,057 | Great Britain | Feb. 15, 1940 |